United States Patent [19]
Owens

[11] 3,877,690
[45] Apr. 15, 1975

[54] PRESSURE VISE
[75] Inventor: Andrew C. Owens, Detroit, Mich.
[73] Assignee: Albert D. Lambert, Detroit, Mich.; a part interest
[22] Filed: Mar. 4, 1974
[21] Appl. No.: 448,034

[52] U.S. Cl. ............... 269/265; 83/277; 83/465; 214/1 F; 226/150; 226/162; 269/268; 269/287
[51] Int. Cl. ............................................. B23q 5/26
[58] Field of Search ............ 83/277, 465; 214/1 F; 226/150, 162–167; 269/25, 104, 109, 265, 268, 287

[56] References Cited
UNITED STATES PATENTS
| | | | |
|---|---|---|---|
| 3,194,100 | 7/1965 | Fehlberg | 226/150 |
| 3,510,040 | 5/1970 | Cleland | 226/162 |
| 3,735,907 | 5/1973 | Kuchar | 226/162 |

Primary Examiner—Roy Lake
Assistant Examiner—Mark S. Bicks
Attorney, Agent, or Firm—Cullen, Settle, Sloman & Cantor

[57] ABSTRACT

In an apparatus for feeding elongated stock to a work station, an improved vise for securely holding the stock against a work surface to prevent rotation of the stock. The vise includes opposed lateral guides extending upwardly from the work surface parallel to the direction of feed and a top guide having front and rear bearing portions both opposing the work surface. The top guide is shaped so that the front bearing portion is closer to the work surface to firmly hold the stock against rotation. The shaping of the top guide may be eliminated by the addition of a thin bearing plate onto the front portion. This thin plate may be tapered rearwardly for longer life. The lateral guides may also be shaped or may include thin bearing plates.

8 Claims, 11 Drawing Figures

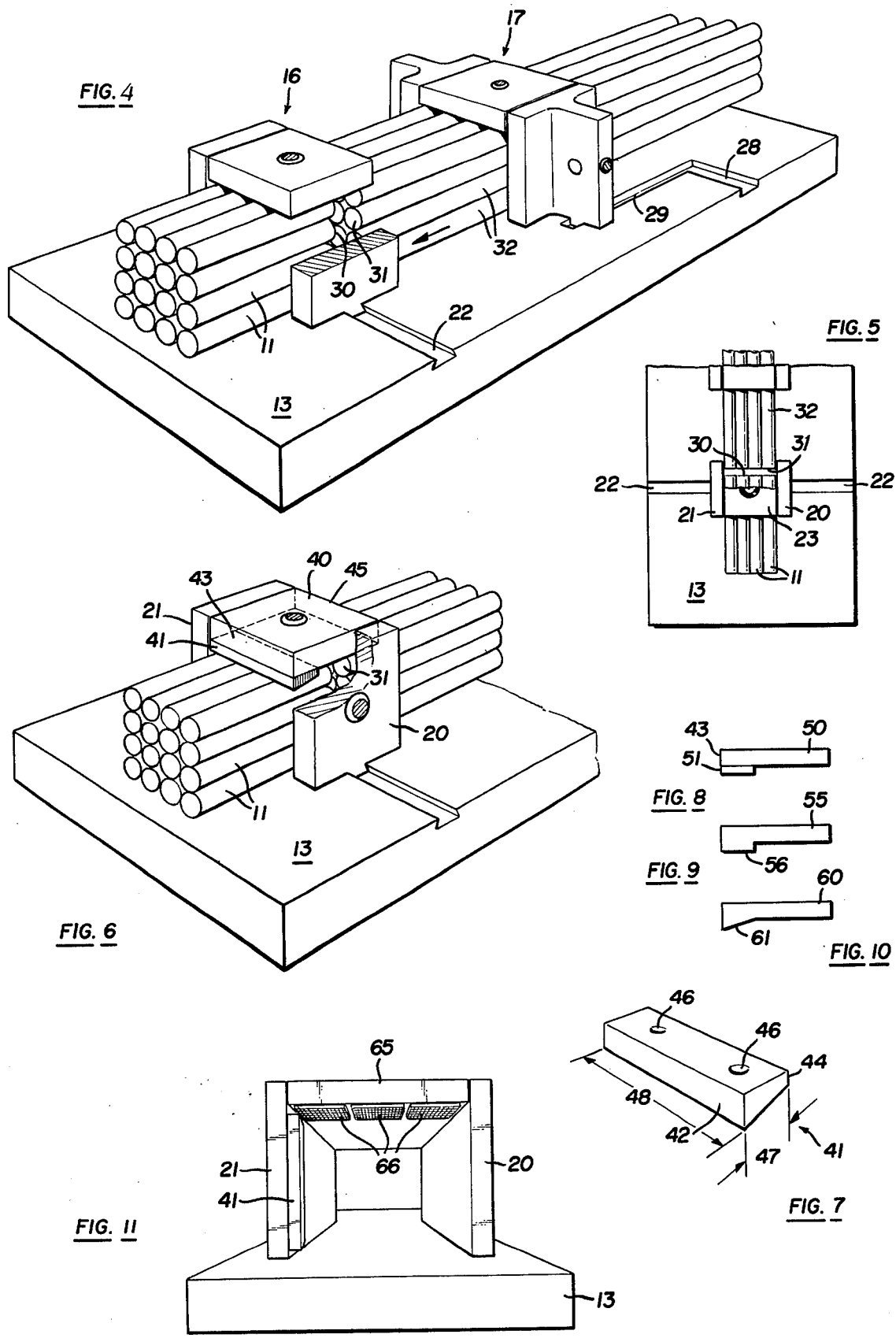

PRESSURE VISE

BACKGROUND OF THE INVENTION

Machines for feeding elongated stock to a work station are, of course, well known. When the work being performed at the work station includes cutting or drilling or any other operation transverse to the direction of feed, a torque or twisting force is placed upon the stock material.

Because of this twisting force, if the stock material is not firmly held in place, the stock twists or rotates about its longitudinal axis during the operation at the work station. This twisting or rotating is costly and dangerous because it can easily break the drill bit or saw blade, causing them to fly out and injure the machine operator, and requiring frequent replacement of the drill bit or saw blade.

Therefore, prior to the present invention, the only solution was not to operate on short pieces of stock. Thus, if the stock was being fed into a cutting station, to cut small lengths of stock from a bundle of elongated pieces, when the remainder of stock not yet cut reached a certain minimum length the remaining stock was scrapped. For example, when cutting one inch long slugs from 18 or 20 foot long metal bars, it was commonplace to scrap the last one to two feet of the bars because of the turning or rotating problem previously described.

Furthermore, in those machines where a second bundle of stock is fed immediately following a first bundle of stock, there exists an even less satisfactory hold or grip on the first bundle of stock as the second bundle of stock enters the feeding means. Thus, the problem of rotation of the short stock material is increased.

The invention herein relates to an improved means for securely holding short pieces of stock material.

SUMMARY OF THE INVENTION

The invention herein relates to an apparatus for securely holding elongated stock for operations at a work station. Specifically, in an apparatus for feeding elongated stock toward a work station for a cutting operation or the like, the stock being supported on a work surface and the apparatus including side members generally perpendicular to the work surface and parallel to the direction of feed, and a top guide member cooperating with the side members to form a vise, the improvement of the leading end of at least one of the side or top guide members being spaced closer to the work surface than its trailing end to concentrate the bearing force of the member onto the elongated stock for holding the stock firmly against rotation.

To concentrate the force of the member on short pieces of stock, the member may be initially formed or shaped so that its leading or bearing portion is closer to the work surface then its trailing portion. Shaping the member may be eliminated by the addition of a thin plate to form the bearing portion of the member. This thin plate may be tapered rearwardly for improved life and performance in holding the stock against rotation.

The various objects and advantages of the present invention will become apparent upon reading the following detailed description taken in conjunction with the drawings.

BRIEF DESCRIPTION OF THE DRAWINGS

In the drawings, wherein like reference numerals identify corresponding parts:

FIG. 4 is a perspective illustration of the problem observed in the prior art apparatus;

FIG. 5 is a plan view of FIG. 4;

FIGS. 6 and 7 illustrate a preferred embodiment of the present invention; and

FIGS. 8–11 illustrate other embodiments of the present invention.

DETAILED DESCRIPTION OF THE INVENTION

Figure 1:
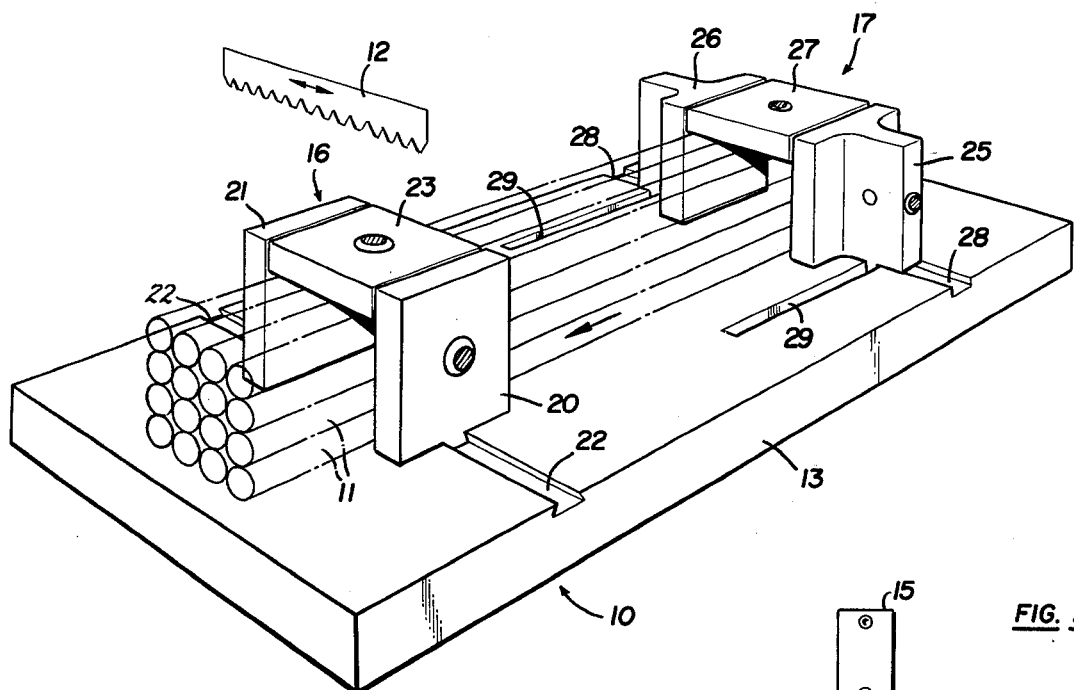
FIG. 1 is a perspective illustration of the environment of the present invention including a feeding apparatus and a work station.
Figure 2:
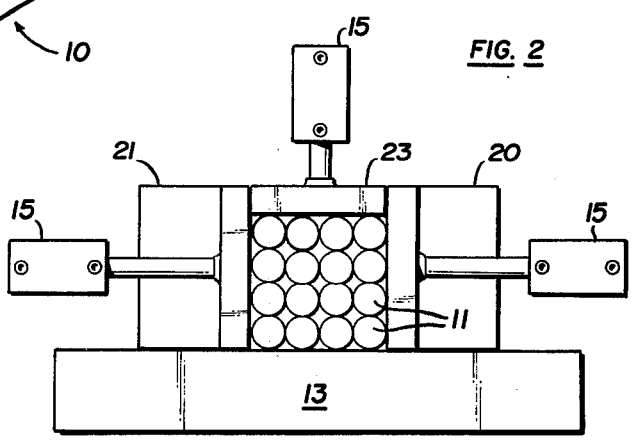
FIG. 2 is a front elevation view of the apparatus of FIG. 1.
Figure 3:
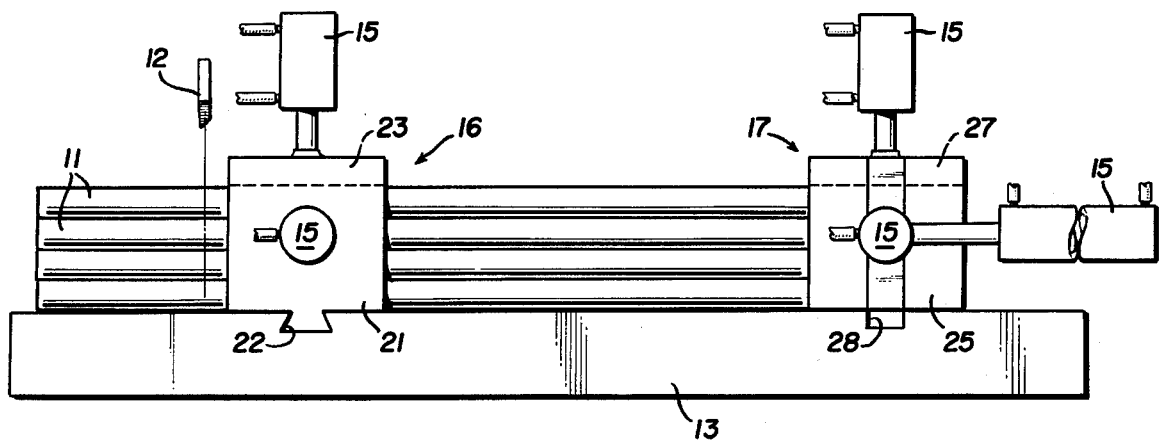
FIG. 3 is a side elevation view of the apparatus of FIG. 1.

FIGS. 1 through 3 illustrate an apparatus 10 for feeding a bundle of elongated stock 11 to a work station 12, the work station shown schematically by a portion of a saw blade which moves tranversely to the direction of feed of the elongated stock. The saw blade may move continuously or reciprocally transversely to the direction of the advancing of the stock 11. The stock is shown supported on a work surface or table 13.

The feeding apparatus 10 of the present invention is hydraulically operated as shown diagrammatically by the cylinders 15 which operate a front guide system 16 and a rear feed system 17.

The front guide system 16 includes two opposed guides 20 and 21 which extend upwardly from the work surface 13 and are parallel to the direction of advancing of the stock material 11. The hydraulic operation of the side members 20 and 21 is transversely of the direction of feed as illustrated diagramatically by the tracks 22 in the work surface 13. The front guide system also includes a top guide member 23 which moves vertically transversely of the direction of feeding of stock 11.

The rear feed system 17 include opposed side members 25 and 26 and top member 27. The side members 25 and 26 extend upwardly from the work surface 13 and are parallel to the direction of feed of the stock material 11 and, as with the front guide system, the rear feed system includes a top 27 which has a bearing surface opposing the work surface 13.

The rear feed system also operates hydraulically transversely of the direction of feed, as shown by the track 28 in the work surface 13 and also parallel to the direction of feed as shown by the tracks 29. Functionally, the rear feed members move inwardly to grip the stock 11 and then move forwardly along track 29 to feed the stock toward the work station 12. After the rear feed members have completed their forward travel, the front guide system 16 grips the stock and the cutting operation at the work station 12 commences.

Conventionally, during the operation of apparatus as shown in FIGS. 1-3, as the trailing ends 30 of the stock material 11 passes along the work surface 13 toward the front guide 16, the leading ends 31 of new stock material 32 are placed in an abutting relationship with the trailing ends 30. In this fashion there is a continuous feeding of stock material into the work station 12.

However, as the leading ends of new stock move into the area of front guide members 16 and are gripped thereby, slight variations in the size and shape of the new stock 32 typically causes the front guide system 16 to have an insufficient and unsatisfactory grip on the trailing ends 30 of the old stock 11. Thus, when the saw at the work station 12 moves transversely of the direction of feed, the remaining portions of the front stock 11 tend to turn or rotate. As previously mentioned this can cause damage to the saw blade as well as potentially injuring employees.

Prior to the present invention, the solution was to discard the remaining short pieces of stock 11 and merely advance the new stock 32 to the work station.

Recognizing the foregoing problem, the present invention contemplates a solution by providing a new front guide system 16. Any one or more of the members of front guide 16 may incorporate the principles of this invention to concentrate the bearing force on the front stock material 11. This may be accomplished in one of several ways.

Specifically, in a first embodiment, as shown in FIGS. 6 and 7 only a new top guide is shown, including a generally rectangular plate 40 having a thin bearing member 41 secured to the leading or front underside part of plate 40.

The bearing member 41 tapers rearwardly from a thicker portion 42 at the front 43 of the plate 40 to a thinner portion 44 which terminates intermediate the front 43 and rear 45 of plate 40.

The bearing member has two countersunk holes 46 so that the bearing member may be bolted to the plate 40 with the bolts not damaging the stock. Alternatively a suitable bonding technique may be utilized.

In the preferred embodiment the bearing member 41 tapers from a thicker portion 42, of 11/32 inch, to a thinner portion 44 of 5/32 inch, with a width 47 of 1.5 inches and a transverse dimension 48 of 5 5/16 inches.

Thus the front 43 of the improved top guide is closer to the surface 13 than the rear 45 of the guide. As the new stock 32 moves under the rear portion 45 of the top guide, the front portion 43 of the top guide maintains a positive contact with the stock 11 even if the leading ends 31 of the new stock 32 is of a slightly greater size then the stock 11.

Thus, as shown in FIG. 6, the front portion 43 of the new top guide maintains a positive contact with the stock 11 and concentrates the force from the hydraulic system 15 against the trailing ends 30 of the stock 11. This firmly retains the stock within the lateral guides 20, 21 and against the work surface 13 and the stock is held against the rotation and slippage.

With reference to FIG. 8, another embodiment of the guide is illustrated according to the principles of the present invention. This guide 50 has a thin flat plate 51 at the front end 43 in lieu of the shaped or tapered bearing member 41 of the embodiment of FIGS. 5, 6 and 7. This thin plate also concentrates the bearing force of a guide member on the trailing end 30 of the stock 11 as new stock 32 is fed past the rear of the guide.

The overall shape of the combined guide and bearing member as shown in FIGS. 6 and 7, or 8, can be incorporated into a one piece guide. Thus the guide plate 50 and bearing member 51 of FIG. 8 can be made as a one-piece feed member 55 as shown in FIG. 9. This member 55 has a downwardly projecting portion as at 56 corresponding to the thickness and function of the bearing member 51.

Similarly FIG. 10 illustrates a one-piece feed member 60 including a tapered projection 61 corresponding to the combined rectangular plate 40 and tapered bearing member 41 of FIGS. 6 and 7. One or more of the side guides 20, 21 of FIG. 6 may be replaced by the guide of FIG. 10 if desired.

FIG. 11 illustrates yet another embodiment of the front feed system wherein the top guide member includes a rectangular plate 65 having a plurality of downwardly depending bearing members 66 such as carbide grips which can be brazed to the plate 65. Also shown in FIG. 11 is the tapered plate 41 on side member 21.

It must be appreciated that while the grips of FIG. 11 and the plate of FIG. 6 are illustrated on the top guide, in practice any embodiment shown may be utilized on anyone or more of the side and/or top members of the front guide system 16.

The foregoing is the description of the present invention including a guide member to concentrate the force on elongated stock to firmly hold the stock against the transverse movement of a cutting surface at a work station to avoid rotation of the stock. Since various changes and modifications may be made without departing from the spirit and scope of the invention, the invention should be limited only by the following claims.

What is claimed is:

1. In an apparatus for feeding elongated stock toward a work station said stock having a leading end and a trailing end, and being supported by a work surface, said apparatus including side members generally perpendicular to the work surface and parallel to the direction of feed, each having front and rear bearing portions and a top guide member having a front bearing portion and a rear bearing portion, both opposing said work surface, the improvement comprising:
   said front bearing portion of at least one of said members being spaced closer to said work surface than said rear bearing portion for concentrating the force of said member onto said elongated stock and for holding said stock firmly between said side members said top member and said work surface against rotation.

2. The invention as defined in claim 1, wherein said at least one member includes a pressure plate on said front bearing portion, said pressure plate terminating intermediate the front and rear bearing portions of the member.

3. The invention as defined in claim 2 wherein said pressure plate is tapered from a thicker portion at said front bearing portion of said member to a thinner portion intermediate said front and rear bearing portions of said member.

4. The invention as defined in claim 2 wherein said member includes a plurality of pressure plates.

5. The invention as defined in claim 1 wherein said top guide member has its front bearing portion spaced closer to said work surface and wherein the surface of said top guide opposing said work surface includes a tapered portion, said taper being progressively thicker in the direction of feeding said stock.

6. The invention as defined in claim 1 wherein said top guide member includes a downward projection opposing said work surface.

7. The invention as defined in claim 6 wherein said downward projection is tapered increasing thicker in the direction of feeding said stock.

8. The invention as defined in claim 1 wherein said at least one member includes a discrete pressure plate on said front bearing portion.

* * * * *